G. J. BRAGG.
BANANA PEELING MACHINE.
APPLICATION FILED APR. 16, 1910. RENEWED JULY 1, 1913.
1,088,400.
Patented Feb. 24, 1914.
3 SHEETS—SHEET 1.
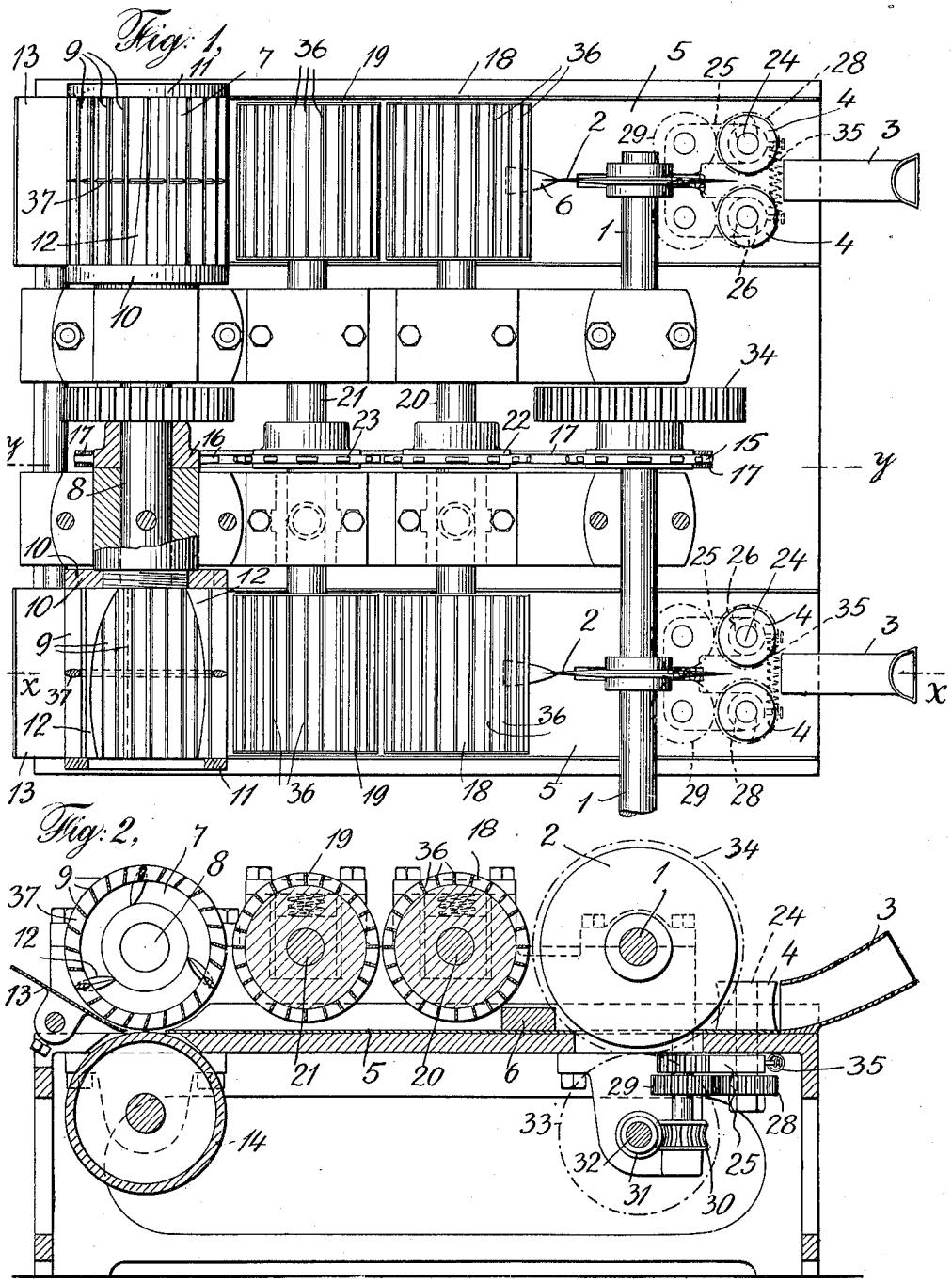
Witnesses
Max B. A. Doring
Paul H. Frank
Inventor
George J. Bragg
By Attorneys
Marbell Matty G. J. BRAGG.
BANANA PEELING MACHINE.
APPLICATION FILED APR. 16, 1910. RENEWED JULY 1, 1913.
1,088,400.
Patented Feb. 24, 1914.
3 SHEETS—SHEET 2.
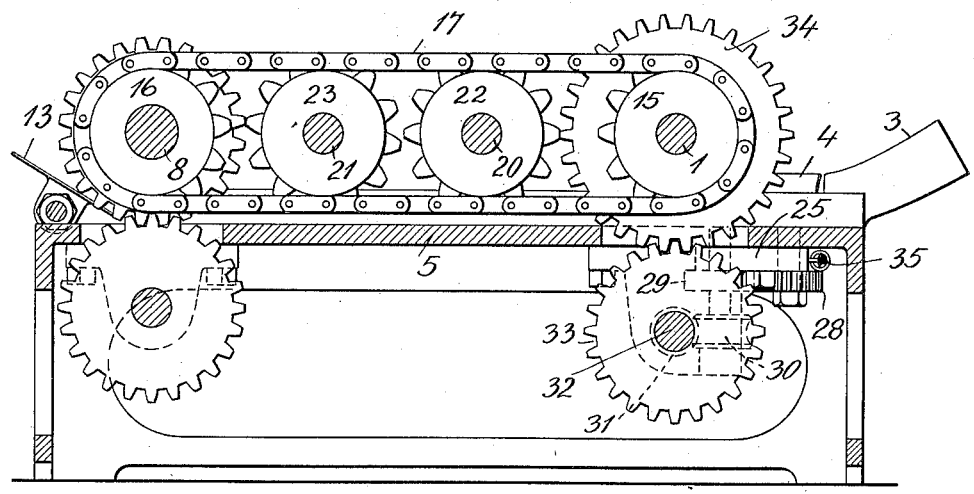
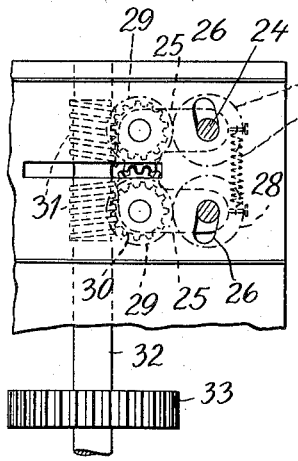
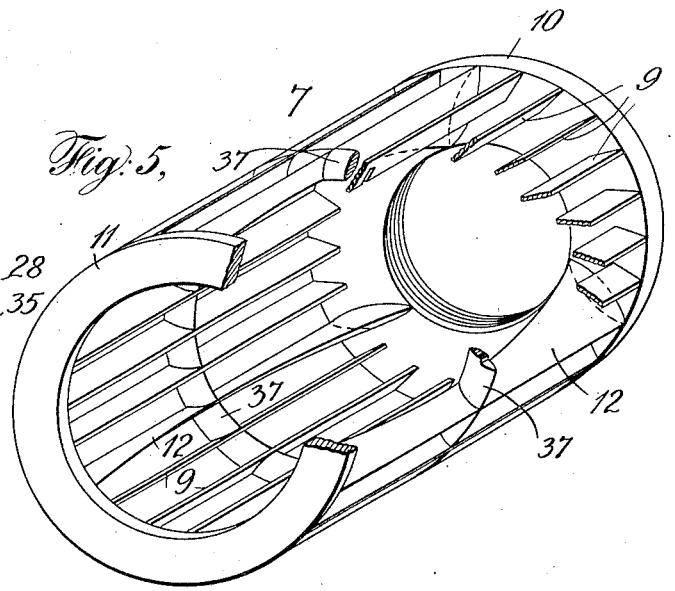

G. J. BRAGG.
BANANA PEELING MACHINE.
APPLICATION FILED APR. 16, 1910. RENEWED JULY 1, 1913.
1,088,400.
Patented Feb. 24, 1914.
3 SHEETS—SHEET 3.
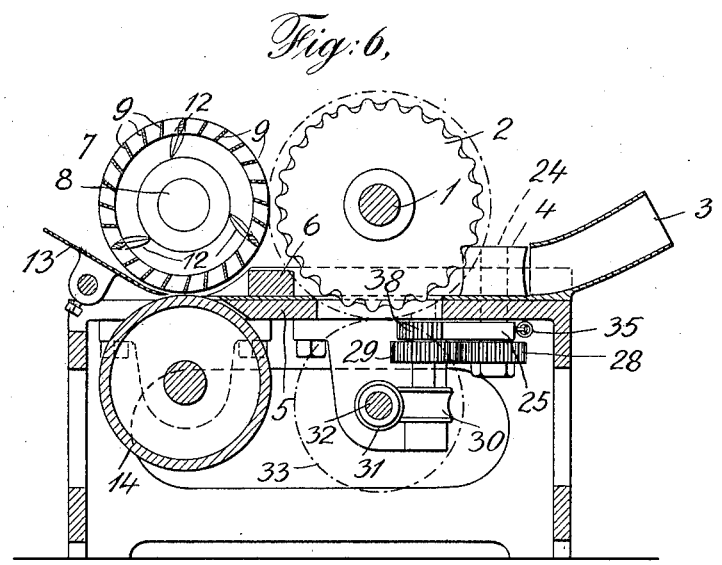
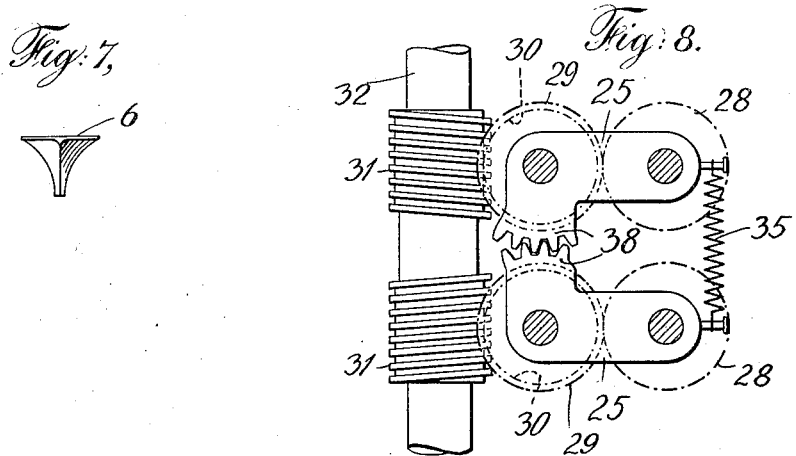

UNITED STATES PATENT OFFICE.

GEORGE J. BRAGG, OF PHILADELPHIA, PENNSYLVANIA.

BANANA-PEELING MACHINE.

1,088,400. Specification of Letters Patent. Patented Feb. 24, 1914.

Application filed April 16, 1910, Serial No. 555,941. Renewed July 1, 1913. Serial No. 776,867.

*To all whom it may concern:*

Be it known that I, GEORGE J. BRAGG, a citizen of the United States of America, and a resident of Philadelphia, county of Philadelphia, and State of Pennsylvania, have invented certain new and useful Improvements in Banana-Peeling Machines, of which the following is a specification.

My invention relates to improvements in machines for splitting and peeling fruit, and is particularly applicable to the peeling of bananas and like fruit.

My invention comprises improved splitting means, improved means for separating the pulp of the fruit from the skin, and various other features hereinafter described and particularly pointed out in the claims.

Bananas, particularly in the green state, (the state in which they will customarily be handled by this machine) are somewhat difficult to peel, the skin adhering very firmly to the pulp. Hand peeling is objectionable, both because of its slowness, and because the juices of the banana produce sores on the hands of the workers so that it is impossible for any one to continue the peeling for any length of time. In such peeling machines as have been used before, to my knowledge, the separation of the peel from the pulp, has been more or less imperfect, and the machines have been slow in operation and altogether unsatisfactory.

The object of my invention is to produce a simple machine for the purpose described, which shall produce very effective separation of the pulp from the peel or skin, and which shall be rapid in operation and shall adapt itself automatically to fruit of different sizes.

I will now proceed to describe my invention with reference to the accompanying drawings, and will then point out the novel features in claims.

In the drawings: Figure 1 shows a top view of a duplex machine embodying my invention; Fig. 2 shows a longitudinal vertical section of the machine on the section line *x—x* of Fig. 1; Fig. 3 shows a similar section on the line *y—y* of Fig. 1; Fig. 4 is a detail plan view of the shafts driving the feed rolls and associated parts; Fig. 5 is a fragmentary isometric perspective view of one of the pulp-gathering heads, detached; Fig. 6 is a longitudinal section, similar to Fig. 2, of an alternative form of machine; and Fig. 7 is a detail end view of one of the spreading cams. Fig. 8 is a detail plan view of the pivoted hangers and associated parts.

In the drawings 1 designates the main driving shaft of the machine, to which power is applied from any convenient source, and 2, 2 designate rotary knives mounted upon this shaft.

3, 3 designate feeding chutes through which the bananas or other fruit are fed to the splitting knives and 4, 4 designate grooved feed rolls driven as hereinafter described, and located just in advance of the splitting knives 2.

5 designates a table over the surface of which the bananas are fed by the rotary knives 2, and by other means hereinafter described, and 6, 6 designate spreading cams whereby the halves of the split bananas as they leave the knives 2 are spread apart and turned over upon the table 5 with their pulp sides uppermost.

7, 7 designate pulp-gathering heads mounted upon a shaft 8, driven as hereinafter described and consisting of blades 9 raking backward slightly from a true radial position and supported at the ends by rings 10 and 11, of which ring 10 of each pulp-gathering head is secured to the shaft 8; these rings 10 and 11 of each head being connected by a plurality of longitudinal ribs 12 which also constitute blades.

Adjacent to the underside of each pulp-gathering head 7 there is a peeling blade 13 by which the peel is separated from the pulp as hereinafter described, and beneath each pulp-gathering head 7 there is a rotary drum 14, guarding an orifice in the table 5 beneath the pulp-gathering head, and so preventing the banana from being forced downward through such opening by the action of the blades of the pulp gathering head.

The shaft 8 upon which the pulp-gathering heads are mounted, is driven from shaft 1 by means of sprocket gears 15 and 16 and a sprocket chain 17. Feed rolls 18 and 19 are located between each splitting knife 2 and its corresponding pulp-gathering head 7, for feeding the split bananas from the splitting knives to said head, and these feed rolls 18 and 19 are mounted upon shafts 20 and 21 respectively, these shafts being driven by means of sprocket gears 22 and 23 engaging the same sprocket chain 17.

The grooved feed rolls 4 are mounted upon stub shafts 24 carried by swinging hangers 25 pivoted to the table. These stub shafts 24 project downward through slots 26 in the table, and at their lower ends carry gears 28 coacting with other gears 29 mounted concentrically with the pivotal axes of hangers 25 and driven by means of spiral gears 30 and 31 from a shaft 32 itself driven from shaft 1 through gears 33 and 34. A spring 35 tends to draw these hangers 25 together.

The feed rolls 18 and 19 are provided with projecting teeth 36 which engage the pulp of the banana but do not separate it from the skin, but merely serve, by such engagement, to feed the bananas along the table.

The operation of this machine is as follows: A banana, fed in through one of the chutes 3, is engaged by the corresponding feed rolls 4 and fed thereby to the revolving cutter 2, which splits the banana lengthwise, at the same time carrying it forward to and beyond the spreader 6, the two halves of the split banana being turned over with their pulp sides uppermost by this spreader 6, and being then engaged by the teeth of the first feed roll 18, whereby the halves of the banana are fed forward to the roll 19, which in like manner feeds them forward to the pulp-gathering head 7. The blades of this head 7 divide the pulp of the banana into small pieces which remain temporarily between and filling the spaces between said blades, the peel of the banana being separated from the surface of the said head 7 and deflected downward by the peeling blade 13. Other bananas being fed through the machine in the same manner, are acted upon in the same manner, and the pulp filling the spaces between the blades of the pulp-gathering head 7 is forced into the interior of said head by the pulp of other bananas which said head later encounters, such pulp passing out at the outer end of the head and being caught in receptacles not shown, since in general they will form no actual part of the machine. The drum 14 holds the halves of the banana close up against the pulp-gathering head 7 during the action of said head on the banana, and thereby insures that the said head shall gather practically all of the pulp, the space between the edges of the blade of the pulp-gathering head, and the drum 14, being only about the thickness of an average peel, or even less. It does no harm if the blades of the pulp-gathering head crease the peel, provided they do not actually sever it; and the peel of the green banana is so tough that there is little probability of these blades actually severing the peel, when the parts are in proper adjustment.

The machine shown is a duplex machine; that is to say, it consists of two complete splitting, feeding and pulp-gathering structures, driven from the same shaft but in all respects similar, so that only one of these mechanisms has been described above.

To further stiffen the blades of the pulp-gathering heads, I sometimes connect the three connecting bars 12 by means of an annular ring 37, notched to receive the blades 9, which are themselves similarly notched.

The feeding rolls 18 and 19 are not necessary, and though convenient, may be dispensed with. This is illustrated in Fig. 6, in which the pulp-gathering heads 7 are shown located close up against the splitting knives 2 so that they receive the banana halves directly from said splitting knives.

As previously stated, the feed rolls 4 are so mounted upon the swinging hangers 25, as to be capable of separation one from the other to accommodate fruit of different sizes. In order that the two rolls may separate equally in all cases, so that the fruit will be presented centrally to the splitting knife, the hangers 25 are connected, at their hubs, by gear sectors 38.

In case difficulty is found in causing a plain edged splitting knife, such as shown in Figs. 1 and 2, to feed the bananas along, besides cutting them, the edge of the blade is notched as indicated in the machine shown in Fig. 6.

What I claim is:—

1. A fruit peeling machine such as described comprising in combination splitting means, a pulp-gathering head arranged to receive the split fruit and comprising teeth adapted to divide the pulp and to retain it between them, and a peeling knife in coöperative proximity to such head, arranged to separate the peel therefrom.

2. A fruit peeling machine such as described comprising in combination a rotary splitting-knife, a pulp-gathering head arranged to receive the split fruit and comprising teeth adapted to divide the pulp and to retain it between them, and a peeling knife in coöperative proximity to such head, arranged to separate the peel therefrom.

3. A fruit peeling machine such as described comprising in combination splitting means, rotary feeding means for delivering the fruit to said splitting means, a pulp-gathering head arranged to receive the split fruit and comprising teeth adapted to divide the pulp and to retain it between them, and a peeling knife in coöperative proximity to such head, arranged to separate the peel therefrom.

4. A fruit peeling machine such as described comprising in combination splitting means, a feed chute, rotary feeding means arranged to receive fruit therefrom and deliver same to said splitting means, a pulp-gathering head arranged to receive the split fruit and comprising teeth adapted to divide the pulp and to retain it between them, and a peeling knife in coöperative proximity to such head, arranged to separate the peel therefrom.

5. A fruit peeling machine such as described comprising in combination a rotary splitting knife, rotary feeding means for delivering the fruit to said splitting means, a pulp-gathering head arranged to receive the split fruit and comprising teeth adapted to divide the pulp and to retain it between them, and a peeling knife in coöperative proximity to such head, arranged to separate the peel therefrom.

6. A fruit peeling machine such as described comprising in combination a rotary splitting knife, a feed chute, rotary feeding means arranged to receive fruit therefrom and deliver same to said splitting means, a pulp-gathering head arranged to receive the split fruit and comprising teeth adapted to divide the pulp and to retain it between them, and a peeling knife in coöperative proximity to such head, arranged to separate the peel therefrom.

7. A fruit peeling machine such as described comprising in combination splitting means, a pulp-gathering head, rotary feeding means arranged to receive split fruit from said splitting means and to deliver same to said head, said head arranged to receive the split fruit, and comprising teeth adapted to divide the pulp and to retain it between them, and a peeling knife in coöperative proximity to such head, arranged to separate the peel therefrom.

8. A fruit peeling machine such as described comprising in combination splitting means, a pulp-gathering head, a table between said splitting means and head, and feeding means between said splitting means and head, arranged to feed the split fruit over said table, said head adapted to receive the split fruit and comprising teeth adapted to divide the pulp and to retain it between them.

9. A fruit peeling machine such as described comprising in combination splitting means, a pulp-gathering head, a table between said splitting means and head, and feeding means between said splitting means and head, arranged to feed the split fruit over said table, said head adapted to receive the split fruit and comprising teeth adapted to divide the pulp and to retain it between them, and a peeling knife in coöperative proximity to such head, arranged to separate the peel therefrom.

10. A fruit peeling machine such as described comprising in combination splitting means, a pulp-gathering head arranged to receive the split fruit, and comprising teeth adapted to divide the pulp and to retain it between them, and a supporting drum in coöperative proximity to said head.

11. A fruit peeling machine such as described, comprising in combination splitting means, a pulp-gathering head arranged to receive the split fruit, and comprising teeth adapted to divide the pulp and to retain it between them, a supporting drum in coöperative proximity to said head, and a peeling knife also in coöperative proximity to said head, arranged to separate the peel therefrom.

12. A pulp-gathering head for fruit peeling machines, comprising a hollow drum provided with teeth formed by blades carried by said drum, there being spaces between the blades for the passage of pulp into the interior of the drum, said blades raking backward from corresponding radii of the drum.

13. A fruit peeling machine such as described, comprising in combination splitting means, a pulp-gathering head arranged to receive the split fruit, and comprising teeth adapted to divide the pulp and to retain it between them, and spreading means interposed between said splitting means and pulp-gathering head.

14. A fruit peeling machine such as described, comprising in combination rotary splitting means, a rotary pulp-gathering head, and a drive chain connecting said splitting means and head, whereby the one of said members is driven from the other, and intermediate rotary feeding means likewise driven by said drive chain.

15. A fruit peeling machine such as described, comprising in combination splitting means and pulp-gathering means arranged to act upon the split fruit, and comprising means for picking up and holding the pulp.

16. A fruit peeling machine such as described, comprising in combination splitting means, rotary feed rolls rotated in proximity thereto, pivoted gear-connected hangers carrying said feed rolls and mounted to move toward and from each other, yielding means tending to draw said feed rolls together, means for driving said feed rolls, and a pulp-gathering head.

In testimony whereof I have signed this specification in the presence of two subscribing witnesses.

GEORGE J. BRAGG.

Witnesses:
 EUGENE D. BOYER,
 H. M. MARBLE.